US012738044B2

(12) United States Patent
Zhang et al.

(10) Patent No.: US 12,738,044 B2
(45) Date of Patent: Sep. 15, 2026

(54) USING NEURAL LANGUAGE MODELS FOR LONG-TERM ACTION ANTICIPATION FROM VIDEOS

(71) Applicants: Honda Motor Co., Ltd., Tokyo (JP); Brown University, Providence, RI (US)

(72) Inventors: Ce Zhang, Chapel Hill, NC (US); Changcheng Fu, Los Angeles, CA (US); Shijie Wang, Providence, RI (US); Qi Zhao, Providence, RI (US); Chen Sun, San Francisco, CA (US); Nakul Agarwal, San Francisco, CA (US); Kwonjoon Lee, San Jose, CA (US)

(73) Assignees: Honda Motor Co., Ltd., Tokyo (JP); Brown University, Providence, RI (US)

( * ) Notice: Subject to any disclaimer, the term of this patent is extended or adjusted under 35 U.S.C. 154(b) by 353 days.

(21) Appl. No.: 18/539,746

(22) Filed: Dec. 14, 2023

(65) Prior Publication Data

US 2025/0014321 A1 Jan. 9, 2025

Related U.S. Application Data

(60) Provisional application No. 63/511,822, filed on Jul. 3, 2023.

(51) Int. Cl.
*G06V 10/82* (2022.01)
*G06V 20/40* (2022.01)

(52) U.S. Cl.
CPC .............. *G06V 10/82* (2022.01); *G06V 20/41* (2022.01)

(58) Field of Classification Search
CPC ......... G06V 10/82; G06V 20/41; G06V 40/20
See application file for complete search history.

(56) References Cited

U.S. PATENT DOCUMENTS 11,640,710 B2 * 5/2023 Liu ........................ G06V 20/40 382/156
2018/0075306 A1 * 3/2018 Mehrseresht ....... G06F 18/2411
(Continued)

OTHER PUBLICATIONS

Huang, Daoji, et al. "Palm: Predicting actions through language models@ ego4d long-term action anticipation challenge 2023." arXiv preprint arXiv:2306.16545 (2023). (Year: 2023).*
(Continued)

*Primary Examiner* — Utpal D Shah
(74) *Attorney, Agent, or Firm* — Weiss & Moy, P.C.; Jeffrey D. Moy

(57) ABSTRACT

An electronic device and method for using neural language models for long-term action anticipation from videos is provided. The electronic device receives a video that includes one or more objects performing a physical task and generates, based on the video, a first set of tags that corresponds to a first sequence of actions associated with the physical task. The electronic device generates a first prompt for a neural language model based on the first set of tags and predicts, by application of the neural language model on the first prompt, a second set of tags that corresponds to a second sequence of actions associated with the physical task. The second sequence of actions succeeds the first sequence of actions. The electronic device controls a display device to display first prediction information based on the second set of tags.

20 Claims, 8 Drawing Sheets

(56) References Cited

U.S. PATENT DOCUMENTS

| | | | | |
|---|---|---|---|---|
| 2020/0005673 | A1* | 1/2020 | Lin | G06F 40/58 |
| 2020/0327554 | A1* | 10/2020 | Puthran | G06Q 30/016 |
| 2024/0346820 | A1* | 10/2024 | Tan | G06V 20/41 |
| 2024/0371164 | A1* | 11/2024 | Yan | G06V 10/82 |
| 2024/0412720 | A1* | 12/2024 | Vasylyev | G06F 16/90332 |

OTHER PUBLICATIONS

Lin, Ziyi, et al. "Frozen clip models are efficient video learners." European Conference on Computer Vision. Cham: Springer Nature Switzerland, 2022. (Year: 2022).*
Farha, et al., "When will you do what ?—anticipating temporal occurrences of activities", Proceedings of the IEEE conference on computer vision and pattern recognition, Apr. 3, 2018, 10 pages.
Ahn, et al., "Do as i can, not as i say: Grounding language in robotic affordances", arXiv, Aug. 16, 2022, 34 pages.
Ashutosh, et al., "HierVL: Learning Hierarchical Video-Language Embeddings", Proceedings of the IEEE/CVF Conference on Computer Vision and Pattern Recognition, Jun. 8, 2023, 13 pages.
Bansal, et al., "My view is the best view: Procedure learning from egocentric videos", In Computer Vision-ECCV 2022: 17th European Conference, Tel Aviv, Israel, Proceedings, Part XIII, Springer, Jul. 22, 2022, 25 pages.
Batra, et al., "A Closer Look at Temporal Ordering in the Segmentation of Instructional Videos", arXiv, Oct. 7, 2022, 13 pages.
Bi, et al., "Procedure planning in instructional videos via contextual modeling and model-based policy learning", Proceedings of the IEEE/CVF International Conference on Computer Vision, 2021, pp. 15611-15620.
Brown, et al., "Language Models are Few-Shot Learner", 34th Conference on Neural Information Processing Systems (NeurIPS 2020), 2020, 25 pages.
Camporese, et al., "Knowledge distillation for action anticipation via label smoothing", 25th International Conference on Pattern Recognition (ICPR) IEEE, Dec. 18, 2020, 8 pages.
Carreira, et al., "Quo vadis, action recognition? a new model and the kinetics dataset", Proceedings of the IEEE Conference on Computer Vision and Pattern Recognition, Feb. 12, 2018, 10 pages.
Chang, et al., "Procedure planning in instructional videos", European Conference on Computer Vision (ECCV), Apr. 13, 2020, pp. 17.
Damen, et al., "The EPIC-KITCHENS dataset: Collection, challenges and baselines", IEEE Transactions on Pattern Analysis and Machine Intelligence (TPAMI), Apr. 29, 2020, 18 pages.
Das, et al., "Video+ clip baseline for ego4d long-term action anticipation", arXiv, Jul. 1, 2022, 3 pages.
Driess, et al., "PaLM-E: An embodied multimodal language model", arXiv, Mar. 6, 2023, 18 pages.
Epstein, et al., "Learning temporal dynamics from cycles in narrated video", Proceedings of the IEEE/CVF International Conference on Computer Vision, Sep. 12, 2021, 12 pages.
Farha, et al., "Long-term anticipation of activities with cycle consistency", arXiv, Sep. 2, 2020, 16 pages.
Feichtenhofer, et al., "Slowfast networks for video recognition", Proceedings of the IEEE/CVF international conference on computer vision, Oct. 29, 2019, 10 pages.
Gammulle, et al., "Forecasting future action sequences with neural memory networks", arXiv, Sep. 20, 2019, pp. 12.
Gammulle, et al., "Predicting the future: A jointly learnt model for action anticipation", Proceedings of the IEEE/CVF International Conference on Computer Vision, 2019, pp. 5562-5571.
Gao, et al., "VectorNet: Encoding HD maps and agent dynamics from vectorized representation", Proceedings of the IEEE/CVF Conference on Computer Vision and Pattern Recognition, 2020, pp. 11525-11533.
Ghosh, et al., "Text-Derived Knowledge Helps Vision: A Simple Cross-modal Distillation for Video-based Action Anticipation", Findings of the Association for Computational Linguistics: EACL 2023, Feb. 21, 2023, 11 pages.
Girdhar, et al., "Anticipative video transformer", Proceedings of the IEEE/CVF international conference on computer vision, 2021, pp. 13505-13515.
Girdhar, et al., "ActionVLAD: Learning spatio-temporal aggregation for action classification", Proceedings of the IEEE conference on computer vision and pattern recognition, 2017, pp. 971-980.
Grauman, et al., "Ego4D: Around the world in 3,000 hours of egocentric video", Proceedings of the IEEE/CVF Conference on Computer Vision and Pattern Recognition, 2022, pp. 18995-19012.
Gupta, et al., "Visual programming: Compositional visual reasoning without training", Proceedings of the IEEE/CVF Conference on Computer Vision and Pattern Recognition, 2023, pp. 14953-14962.
Hussein, et al., "Timeception for complex action recognition", Proceedings of the IEEE/CVF Conference on Computer Vision and Pattern Recognition, 2019, pp. 254-263.
Hussein, et al., "Videograph: Recognizing minutes-long human activities in videos", arXiv, Oct. 13, 2019, 10 pages.
Ke, et al., "Time-conditioned action anticipation in one shot", Proceedings of the IEEE/CVF Conference on Computer Vision and Pattern Recognition, 2019, pp. 9925-9934.
Kruglanski, et al., "Habitual behavior is goal-driven", Perspectives on Psychological Science, vol. 15, Issue 5, Jun. 22, 2020, pp. 1256-1271.
Lan, et al., "A Hierarchical Representation for Future Action Prediction", in Computer Vision-ECCV 2014: 13th European Conference, Sep. 6-12, 2014, 16 pages.
Li, et al., "In the eye of beholder: Joint learning of gaze and actions in first person video", Proceedings of the European conference on computer vision (ECCV), 2018, 17 pages.
Lin, et al., "Learning to recognize procedural activities with distant supervision", Proceedings of the IEEE/CVF Conference on Computer Vision and Pattern Recognition, 2022, pp. 13853-13863.
Lu, et al., "Neuro-Symbolic Procedural Planning with Commonsense Prompting", Published as a conference paper at ICLR 2023, Feb. 16, 2023, 34 pages.
Mascaro, et al., "Intention-Conditioned Long-Term Human Egocentric Action Forecasting", arXiv, Dec. 16, 2022, 10 pages.
Nagarajan, et al., "EGO-TOPO: Environment affordances from egocentric video", Proceedings of the IEEE/CVF Conference on Computer Vision and Pattern Recognition, 2020, pp. 163-172.
Narasimhan, et al., "Learning and Verification of Task Structure in Instructional Videos", arXiv, Mar. 23, 2023, 14 pages.
Nawhal, et al., "Rethinking learning approaches for long-term action anticipation", Computer Vision and Pattern Recognition, Oct. 20, 2022, 32 pages.
"GPT-4 Technical Report", OpenAI, Mar. 27, 2023, 100 pages.
Ouyang, et al., "Training language models to follow instructions with human feedback", 36th Conference on Neural Information Processing Systems (NeurIPS 2022), 2022, 15 pages.
Radford, et al., "Learning transferable visual models from natural language supervision", Proceedings of the 38th International Conference on Machine Learning, PMLR 139, 16 pages.
Roy, et al., "Predicting the next action by modeling the abstract goal", arXiv, Jun. 8, 2023, 15 pages.
Schick, et al., "Toolformer: Language models can teach themselves to use tools", arXiv, Feb. 9, 2023, 17 pages.
Sener, et al., "Assembly101: A large-scale multi-view video dataset for understanding procedural activities", Proceedings of the IEEE/CVF Conference on Computer Vision and Pattern Recognition, 2022, pp. 21096-21106.
Sener, et al., "Temporal aggregate representations for long-range video understanding", Computer Vision and Pattern Recognition, Jul. 30, 2020, 23 pages.
Sener, et al., "Zero-shot anticipation for instructional activities", Proceedings of the IEEE/CVF international conference on computer vision, 2019, pp. 862-871.
Soucek, et al., "Look for the change: Learning object states and state-modifying actions from untrimmed web videos", Proceedings of the IEEE/CVF Conference on Computer Vision and Pattern Recognition, 2022, pp. 13956-13966.
Sun, et al., "VideoBERT: A joint model for video and language representation learning", (ICCV) International conference on computer vision, 2019, pp. 7464-7473.

(56) References Cited

OTHER PUBLICATIONS

Sun, et al., "Relational action forecasting", (CVPR) Conference on Computer Vision and Pattern Recognition, 2019, pp. 273-283.
Sun, et al., "PlaTe: Visually-grounded planning with transformers in procedural tasks", IEEE Robotics and Automation Letters, Mar. 2, 2022, 07 pages.
Suris, et al., "ViperGPT: Visual inference via python execution for reasoning", arXiv, Mar. 14, 2023, 18 pages.
Tang, et al., "COIN: A large-scale dataset for comprehensive instructional video analysis", (CVPR) Conference on Computer Vision and Pattern Recognition, 2019, pp. 1207-1216.
Touvron, et al., "LLaMA: Open and efficient foundation language models", arXiv, Feb. 27, 2023, 27 pages.
Tran, et al., "Goal-driven long-term trajectory prediction", Proceedings of the IEEE/CVF winter conference on applications of computer vision, 2021, pp. 796-805.
Vaswani, et al., "Attention is all you need", 31st Conference on Neural Information Processing Systems (NIPS 2017), 2017, 11 pages.
Vondrick, et al., "Anticipating visual representations from unlabeled video", (CVPR) conference on computer vision and pattern recognition, 2016, pp. 98-106.
Wei, et al., "Finetuned language models are zero-shot learners", Published as a conference paper at ICLR 2022, Feb. 8, 2022, 46 pages.
Wei, et al., "Chain-of-thought prompting elicits reasoning in large language models", 36th Conference on Neural Information Processing Systems (NeurIPS 2022), 2022, 14 pages.
Zeng, et al., "Socratic models: Composing zero-shot multimodal reasoning with language", arXiv, May 27, 2022, 30 pages.
Zhao, et al., "P3iv: Probabilistic procedure planning from instructional videos with weak supervision", in Proceedings of the IEEE/CVF Conference on Computer Vision and Pattern Recognition, 2022, pp. 2938-2948.
Zhou, et al., "Towards automatic learning of procedures from web instructional videos", The Thirty-Second AAAI Conference on Artificial Intelligence (AAAI-18), 2018, pp. 7590-7598.
Zhukov, et al., "Cross-task weakly supervised learning from instructional videos", Proceedings of the IEEE/CVF Conference on Computer Vision and Pattern Recognition, 2019, pp. 3537-3545.

* cited by examiner

500

Language Modelling Loss 506

Second Subset 504

Open Faucet, Wash Ginger, Wash Potato, ..., Open Fridge, Touch Meat, Cut Meat

Neural Language Model 102B

First Subset 502

Sharpen Knife, Cut Onion, Remove Onion, Peel Potato, Cut Potato, Remove Potato

USING NEURAL LANGUAGE MODELS FOR LONG-TERM ACTION ANTICIPATION FROM VIDEOS

CROSS-REFERENCE TO RELATED APPLICATIONS/INCORPORATION BY REFERENCE

This application claims priority to U.S. Provisional Patent Application Ser. No. 63/511,822 filed on Jul. 3, 2023, the entire content of which is hereby incorporated herein by reference.

BACKGROUND

Advances in machine learning-based action anticipation have resulted in the development of machine learning models capable of predicting long-term human-object interactions from multimedia frames. Analysis of multimedia frames for detecting a set of objects and a set of actions connected with the set of items may be utilized for predicting long-term human-object interactions. Following that, a long-term actions (LTA) anticipation task may be done based on the detection to forecast a set of future actions that may be required for the completion of a physical activity. Based on the forecast, a machine agent might be used to assist people in doing tasks such as cooking, cleaning, autonomous driving, and so on. However, due to the inherent ambiguity and unpredictability involved with human behavior, machine learning models may find it difficult to perform the LTA anticipating task.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic device is provided. The electronic device may include circuitry. The circuitry may receive a video that may include one or more objects performing a physical task. Based on the received video, the circuitry may generate a first set of tags that may correspond to a first sequence of actions associated with the physical task. The circuitry may further generate a first prompt for a neural language model based on the first set of tags and may predict a second set of tags by application of the neural language model on the first prompt. The second set of tags may correspond to a second sequence of actions associated with the physical task. The second sequence of actions may succeed the first sequence of actions. The circuitry may control a display device to display the first prediction information based on the second set of tags.

According to another embodiment of the disclosure, a method in an electronic device is provided. The method may include receiving a video that may include one or more objects performing a physical task. The method may include generating, based on the video, a first set of tags that may correspond to a first sequence of actions associated with the physical task. The method may further include generating a first prompt for a neural language model based on the first set of tags and predicting a second set of tags by application of the neural language model on the first prompt. The second set of tags may correspond to a second sequence of actions associated with the physical task. The second sequence of actions may succeed the first sequence of actions. The method may further include controlling a display device to display first prediction information based on the second set of tags.

According to another embodiment of the disclosure, a non-transitory computer-readable medium having stored thereon, computer-executable instructions is provided. The computer-executable instructions, when executed by an electronic device, may cause the electronic device to execute operations. The operations may include receiving a video that may include one or more objects performing a physical task and generating a first set of tags that may correspond to a first sequence of actions associated with the physical task based on the video. The operations may include generating a first prompt for a neural language model based on the first set of tags and predicting a second set of tags by application of the neural language model on the first prompt. The second set of tags may correspond to a second sequence of actions associated with the physical task. The second sequence of actions may succeed the first sequence of actions. The operation may further include controlling a display device to display first prediction information based on the second set of tags.

Figure 1:
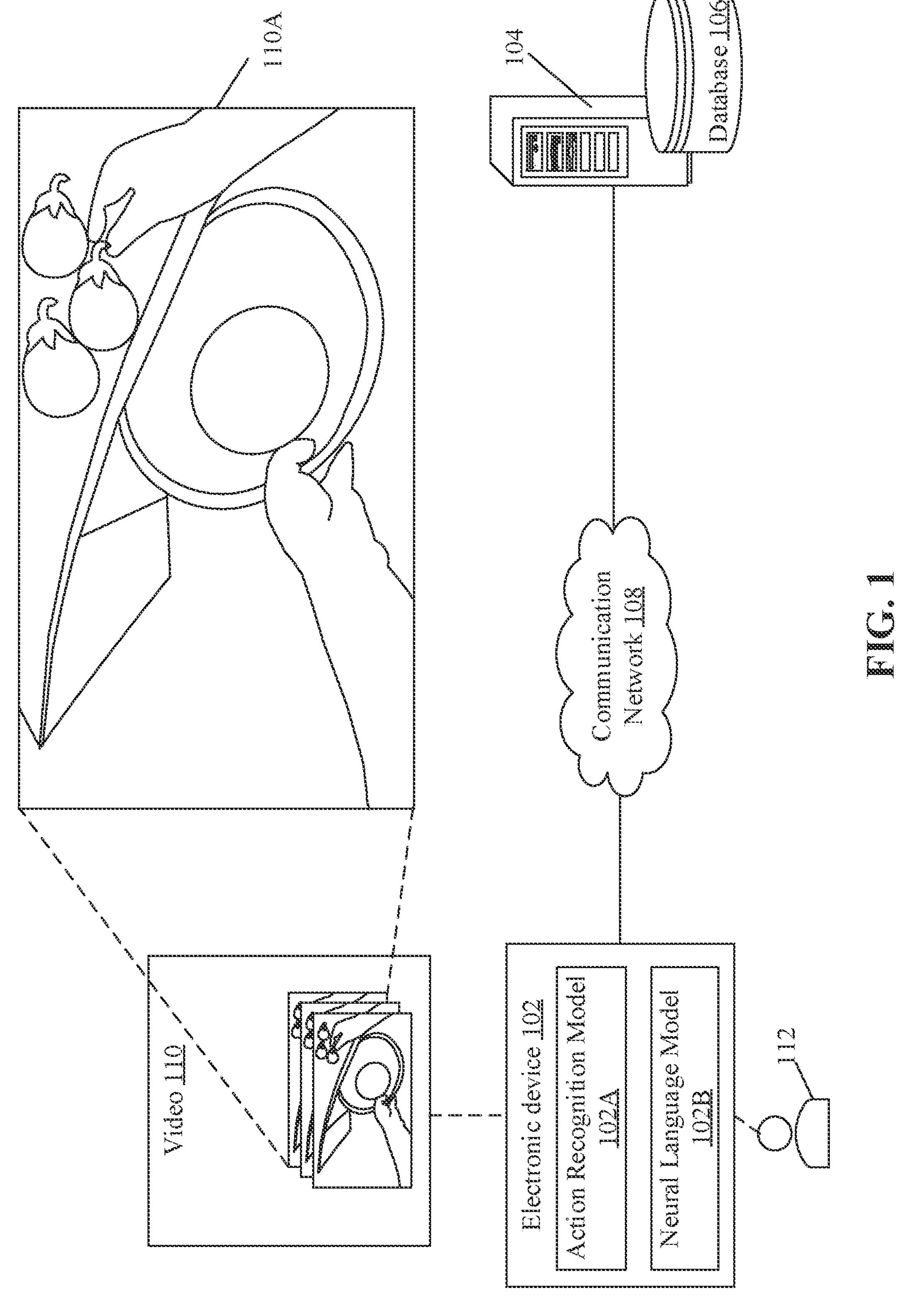
FIG. 1 is a block diagram that illustrates an exemplary network environment for using neural language models for long-term action anticipation from videos, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed system and a method for using neural language models for long-term action anticipation from videos. Exemplary aspects of the disclosure provide an electronic device that may comprise circuitry. The circuitry may be configured to receive a video that may include one or more objects performing a physical task. Based on the video, the circuitry may be further configured to generate a first set of tags that may correspond to a first sequence of actions associated with the physical task. The circuitry may be further configured to generate a first prompt for a neural language model based on the first set of tags. The circuitry may be further configured to predict a second set of tags by application of the neural language model on the first prompt. The second set of tags may correspond to a second sequence of actions associated with the physical task. The second sequence of actions may succeed the first sequence of actions. The circuitry may be further configured to control a display device to display the first prediction information based on the second set of tags.

Typically, machine learning models are capable of predicting long term human-object interactions from multimedia frames. The prediction of long-term human-object interactions may include analysis of the multimedia frames for detection of a set of objects and a set of actions associated with the set of objects. Thereafter, based on the detection, a long-term actions anticipation (LTA) task may be performed to predict a set of future actions that may be necessary for completion of a physical task. Based on the prediction, a machine agent may be employed to assist humans for performance of activities, such as cooking, cleaning, autonomous driving, and the like. However, due to the inherent ambiguity and unpredictability involved with human behavior, machine learning models may find it difficult to perform the LTA anticipating task.

In order to mitigate aforesaid issues, the electronic device of the present disclosure may employ neural language models for long-term action anticipation (LTA) from videos. Herein, the disclosed electronic device may first generate the first set of tags. The first set of tags may be a compact and bottleneck textual representation associated with a procedure of performing the physical task. Based on the generated first set of tags, the first prompt may be generated. The pre-trained neural language model may be applied on the generated first prompt. During a pre-training phase, the neural language model may encode prior knowledge that may be necessary for a long-term action anticipation task. The encoding of the prior knowledge may enable the pre-trained neural language model to determine a final goal of the one or more objects performing the physical task. Further, encoding of the prior knowledge may enable the pre-trained neural language model to predict the second set of tags that may correspond to the second sequence of actions. Thus, the encoded prior knowledge may be used in execution of a bottom-up LTA approach and a top-down LTA approach.

In the bottom-up LTA approach, the disclosed electronic device may generate the first prompt such that the first prompt corresponds to an in-context learning (ICL) prompt. The first prompt may include pairs of input and output tags corresponding to past actions and past action predictions associated with one or more physical tasks that may be same as or different from the physical task. Further, the first prompt may include the first set of tags that may correspond to the first sequence of actions associated with the physical task. After the generation, the pre-trained neural language model may be applied on the first prompt. The pairs of input and output tags in the first prompt may be considered as examples for the prediction of a second set of tags that may correspond to a second sequence of actions. Such actions may succeed the first sequence of actions.

In the top-down LTA approach, the disclosed electronic device may generate the first prompt such that the first prompt corresponds to a chain-of-thought (COT) prompt, Similar to the bottom-up LTA approach, the first prompt may include the pairs of input and output tags. Additionally, the first prompt may include a first question, a second question, and a first set of tags that may correspond to a first sequence of actions associated with the physical task. The first question may be associated with an objective of the physical task and the second question may be associated with the second sequence of actions. After the generation, the pre-trained neural language model may be applied on the first prompt. In a first step, the pre-trained neural language model may infer a final goal associated with the first set of tags. Thereafter, based on the inferred final goal, the pre-trained neural language model may predict the second set of tags that may correspond to the second sequence of actions.

The prediction of the objective of the physical task may help to provide additional context in the prediction of the second set of tags and may ensure that the predicted second set of tags is accurate, ordered, and always related to the physical task. To improve the accuracy of the second set of tags, the predicted second set of tags may be post-processed by replacing one or more invalid tags present in the second set of tags with one or more valid tags. Based on the second set of tags, the first prediction information may be displayed. The first prediction information may be consumed by one or more users or may be used by a system to learn or complete steps of the physical task.

Reference will now be made in detail to specific aspects or features, examples of which are Illustrated in the accompanying drawings. Wherever possible, corresponding, or similar reference numbers will be used throughout the drawings to refer to the same or corresponding parts.

FIG. 1 is a block diagram that illustrates an exemplary network environment that uses neural language models for long-term action anticipation from videos, in accordance with an embodiment of the disclosure. With reference to FIG. 1, there is shown a network environment diagram 100. The network environment diagram 100 may include an electronic device 102, a server 104, a database 106, and a communication network 108. The electronic device 102 may include a neural language model 102B and an action recognition model 102A. The electronic device 102 may also store a video 110, which may be acquired from the server 104, an imaging device (not shown), or a web-based video repository. The electronic device 102 and the server 104 may be communicatively coupled to each other via the communication network 108. In FIG. 1, there is further shown a user 112 who may be associated with the electronic device 102.

The electronic device 102 may include suitable logic, circuitry, and interfaces that may be configured to receive the video 110 and perform a Long-Term Action (LTA) anticipation task using the video 110. The received video 110 may include one or more objects performing a physical task. Examples of the electronic device 102 may include, but are not limited to, a computing device, a robot, a wearable display (such as an extended Reality (XR) device), a smartphone, a cellular phone, a mobile phone, a gaming device, a mainframe machine, a server, a computer workstation, and/or a consumer electronic (CE) device. In an embodiment, the electronic device 102 may be a part of or may be integrated into a vehicle with Advanced driver assistance systems (ADAS) or self-driving ability.

The action recognition model 102A may be an image-to-text model or a video-to-text model that may be trained to identify an action sequence (i.e., a sequence of actions) from an image sequence or a video (such as the video 110). Each action may be associated with a tag (e.g., a verb and a noun pair) and may correspond to a frame (i.e., a time-instant Ti) in the timeline of the video or the image sequence. For example, the action recognition model 102A may determine a first set of tags that may correspond to a first sequence of actions associated with a physical task, such as a cooking activity or a pick-and-place activity in a warehouse. The action recognition model 102A may be defined by its hyper-parameters, for example, a number of weights, a cost function, an input size, a number of layers, and the like. The parameters of the action recognition model 102A may be tuned and weights may be updated so as to move towards a minima of a cost function for the action recognition model 102A. After several epochs of training on the feature information in the training dataset, the action recognition model 102A may be trained to output a result (e.g., an action sequence or verb-noun pairs) for a set of inputs (e.g., image sequence from a video).

The action recognition model 102A may include electronic data, which may be implemented as, for example, a software component of an application executable on the electronic device 102. The action recognition model 102A may rely on libraries, external scripts, or other logic/instructions for execution by a processing device. Additionally, or alternatively, the action recognition model 102A may be implemented using hardware including a processor, a microprocessor (e.g., to perform or control performance of one or more operations), a field-programmable gate array (FPGA), or an application-specific integrated circuit (ASIC). Alternatively, in some embodiments, the action recognition model 102A may be implemented using a combination of hardware and software.

In an exemplary embodiment, the action recognition model 102A may refer to a computer-based system or method that utilizes artificial intelligence techniques such as deep neural networks to analyze and interpret visual content, such as images or videos, and convert such content into textual descriptions or labels describing human actions or activities depicted in the visual data. Examples of the action recognition model 102A may include, but are not limited to, an I3D (Inflated 3D ConvNet) model, a C3D (Convolutional 3D) model, a two-stream CNN model, a TSN (Temporal Segment Network) model, an LRCN (Long-term Recurrent Convolutional Network) model, a TRN (Temporal Relation Network), or a SlowFast network.

The neural language model 102B may be a computational network or a system of artificial neurons arranged in a plurality of layers that may be used to predict a second set of tags (e.g., verb and noun pairs that represent action sequences) based on a natural language prompt. The prompt may include a first set of tags corresponding to a timeline of the video 110. The plurality of layers of the neural language model 102B includes an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural language model 102B. Outputs of each hidden layer may be coupled to inputs of at least one node in other layers of the neural language model 102B. Node(s) in the final layer may receive inputs from at least one hidden layer to output a result. The number of layers and the number of nodes in each layer may be determined from hyper-parameters of the neural language model 102B. Such hyper-parameters may be set before or after training the neural language model 102B on a training dataset.

Each node of the neural language model 102B may correspond to a mathematical function (e.g., a sigmoid function or a rectified linear unit) with a set of parameters, tunable during training of the neural language model 102B. The set of parameters may include, for example, a weight parameter, a regularization parameter, and the like. Each node may use the mathematical function to compute an output based on one or more inputs from nodes in other layer(s) (e.g., previous layer(s)) of the neural language model 102B. All or some of the nodes of the neural language model 102B may correspond to the same or a different mathematical function.

In training of the neural language model 102B, one or more parameters of each node of the neural language model 102B may be updated based on whether an output of the final layer for a given input (from the training dataset) matches a correct result based on a loss function for the neural language model 102B. The above process may be repeated for the same or a different input till a minima of loss function may be achieved, and a training error may be minimized. Several methods for training are known in art, for example, a human feedback-based training approach (such as Reinforcement Learning from Human Feedback (RLHF), a reward-based learning approach, a gradient descent approach, a stochastic gradient descent approach, a batch gradient descent approach, a gradient boost approach, a meta-heuristic approach, and the like.

The neural language model 102B may include electronic data, which may be implemented as, for example, a software component of an application executable on the electronic device 102. The neural language model 102B may rely on libraries, external scripts, or other logic/instructions for execution by a processing device. The neural language model 102B may include code and routines configured to enable a computing device to perform one or more operations for determination of the set of session slots. Additionally, or alternatively, the neural language model 102B may be implemented using hardware including, but not limited to, a processor, a microprocessor (e.g., to perform or control performance of one or more operations), a field-programmable gate array (FPGA), or an application-specific integrated circuit (ASIC). Alternatively, in some embodiments, the neural language model 1028 may be implemented using a combination of hardware and software.

In an exemplary embodiment, the neural language model 102B may refer to a computer-based system or method that employs artificial neural networks, particularly transformer-based architectures, designed to process and generate human language text. These models may be characterized by the ability to understand and generate text by learning patterns and relationships within large datasets, enabling applications in natural language understanding, text generation, translation, and various other language-related tasks. Examples of the neural language model 1028 may include, but are not limited to, a GPT (Generative Pre-trained Transformer) model, a BERT (Bidirectional Encoder Representations from Transformers) model, an ELMo (Embeddings from Language) model, a ULMFIT (Universal Language Model Fine-tuning) model, an XLNet model, T5 (Text-to-Text Transfer Transformer) model, ROBERTa, CTRL (Conditional Transformer Language Model), or BART (Bidirectional and Auto-Regressive Transformers).

The server 104 may include suitable logic, control circuitry, and interfaces, and/or code that may be configured to maintain a repository of video, tags or action sequences associated with a timeline of each video, and other information such as a video source, endpoint information, and a training dataset with action labels. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server. In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 may be incorporated in its entirety or at least partially in the electronic device 102, without a departure from the scope of the disclosure.

The database 106 may include suitable logic, interfaces, and/or code that may be configured to store the tags or action sequences corresponding to a timeline of each video (such as the video 110) and one or more prompts used to predict such tags or action sequences. In some embodiments, the database 106 may store a link or a unique identifier associated with the video 110. The database 106 may be a relational database, a non-relational database, or a set of comma-separated values (csv) files in conventional or big-data storage. The database 106 may be stored or cached on a device, such as a server (e.g., the server 104) or the electronic device 102. The device storing the database 106 may be configured to receive a query to retrieve the stored tags, prompts, and/or the video 110 from the server 104 and/or the electronic device 102. In response, the device of the database 106 may be configured to retrieve and provide the queried tags, the prompts, and/or the video 110 to the server 104 and/or the electronic device 102.

In some embodiments, the database 106 may be hosted on a plurality of servers stored at same or different locations. The operations of the database 106 may be executed using hardware, including but not limited to, a processor, a microprocessor (e.g., to perform or control performance of one or more operations), a field-programmable gate array (FPGA), or an application-specific integrated circuit (ASIC). In some other instances, the database 106 may be implemented using a database management software.

The communication network 108 may include a communication medium through which the electronic device 102 and the server 104 may communicate with each other. The communication network 108 may be one of a wired connection or a wireless connection. Examples of the communication network 108 may include, but are not limited to, the Internet, a cloud network, Cellular or Wireless Mobile Network (such as Long-Term Evolution and 5G New Radio), a satellite network (e.g., a network of a set of low earth orbit satellites), a Wireless Fidelity (Wi-Fi) network, a Personal Area Network (PAN), a Local Area Network (LAN), or a Metropolitan Area Network (MAN). Various devices in the network environment diagram 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The video 110 may be a live-video feed or a pre-recoded video that may be stored on the server 104 or on the electronic device 102. The video 110 may include a set of frames that may depict one or more objects performing a physical task. The physical task may include, for example, a cooking task, a baking task, a grilling task, a surgical task, an order fulfilment task, a physiotherapy session, and the like.

In operation, the electronic device 102 may be configured to receive the video 110 that may include one or more objects performing the physical task. Such objects may include a person, a robot, a machine, or a combination thereof. As an example, the video 110 may include a chef cooking a dish. In another example, the video 110 may include a surgeon performing a surgery and few assistants assisting the surgeon during the surgery. Details related to the reception of the video 110 are further provided, for example, in FIG. 3 (at 302).

Upon reception of the video 110, the electronic device 102 may be configured to generate a first set of tags that may correspond to a first sequence of actions associated with the physical task. Each tag of the first set of tags may be a short textual description of a step in a procedure followed by the object(s) while performing the physical task in the video 110. By way of example, and not limitation, if the physical task is a cleaning task, then the first sequence of actions may correspond to tags such as pick-up mop, pour disinfectant, pour water, mix both, mop surface, and the like. Further details related to the generation of the first set of tags are further provided, for example, in FIG. 3 (at 304).

The electronic device 102 may be further configured to generate a first prompt for the neural language model 102B based on the first set of tags. The generated first prompt may be in accordance with an acceptable Input format of the neural language model 102B. In an embodiment, the first prompt may include the first set of tags. As an example, the first prompt may be "Please complete the following sequence of actions: pick scissors, touch hair, trim hair, pick trimmer". Further details related to the generation of the first prompt are further provided, for example, in FIG. 3 (at 306).

The electronic device 102 may be further configured to predict neural language model 102B a second set of tags that may correspond to the second sequence of actions associated with the physical task. The second set of tags may be predicted by application of the neural language model 102B on the first prompt. The second sequence of actions may succeed the first sequence of actions. In other words, the second sequence of actions may be actions that may occur after the first sequence of actions have been performed so as to complete the physical task. In an embodiment, the neural language model 102B may be pre-trained to predict the second set of tags based on the first prompt. As an example, the first prompt may be "Please complete the following sequence of actions: pickup broom, dust room, pour disinfectant, pour water, mix water". The first prompt may be provided as an input to the neural language model 102B. The neural language model 1028 may output the second set of tags that may correspond to the second sequence of actions. The second set of tags may be "dip wiper, wipe floor, dip wiper, clean wiper".

The electronic device 102 may apply a bottom-up LTA approach or a top-down LTA approach for determination of the second set of tags. Details related to the generation of the second set of tags based on the bottom-up LTA approach are further provided, for example, in FIG. 4. Details related to the generation of the second set of tags based on the top-down LTA approach are further provided, for example, in FIG. 7.

The first set of tags and the prediction, i.e., the second set of tags have use in numerous application areas, such as robotics (e.g., a robot control system that learns from and mimics actions of an object depicted in a video), video tagging (e.g., tagging specific sections of a video timeline), activity evaluation, and recommender systems. The electronic device 102 may be further configured to control the display device to display first prediction information based on the second set of tags. As an example, a user interface (UI) may be rendered on the display device. The UI may include a first UI element and a second UI element. The first UI element may state "the second set of tags is:". The second UI element may state "dip wiper, wipe floor, dip wiper, clean wiper". Further details related to the display of the prediction information are provided, for example, in FIG. 3 (at 310).

Figure 2:
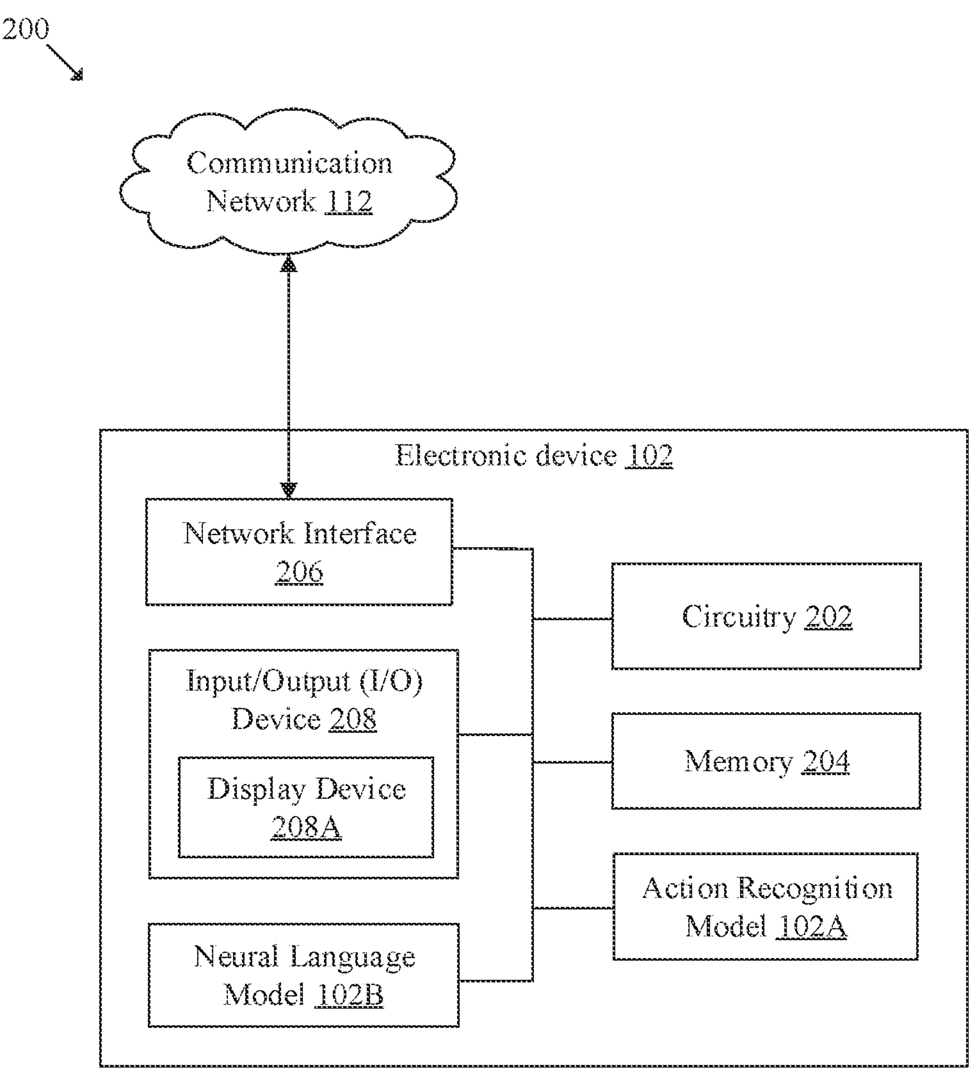
FIG. 2 is a block diagram that illustrates the exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, a network interface 206, an input/output (I/O) device 208, the neural language model 102B, and the action recognition model 102A. The IO device 208 may include a display device 208A. In FIG. 2, it is depicted that the electronic device 102 includes the circuitry 202, the memory 204, the network interface 206, the input/output (I/O) device 208, the neural language model 102B, and the action recognition model 102A. However, it is important to note that this depiction is not limiting, and the electronic device 102 may incorporate fewer or additional components to perform the same or different functions. Details regarding other functions or components have been omitted from this disclosure for the sake of brevity.

The circuitry 202 may include suitable logic, control circuitry, and interfaces that may be configured to execute program instructions associated with different operations to be executed by the electronic device 102. For example, some of the operations may include, a video reception operation, a tag generation operation, a prompt generation operation, and a tag prediction operation. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Tensor Processing Unit (TPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, control circuitry, and interfaces that may be configured to store the one or more instructions to be executed by the circuitry 202. In some embodiments, the memory 204 that may be configured to store the video 110 and model data related to the neural language model 102B and the action recognition model 102A. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may include suitable logic, control circuitry, and interfaces that may be configured to facilitate communication between the electronic device 102 and the server 104, via the communication network 108. The network interface 206 may be implemented by use of various known technologies to support wired or wireless communication of the electronic device 102 with the communication network 108. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer control circuitry. The network interface 206 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5$^{th}$ Generation New Radio (5G NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The I/O device 208 may include suitable logic, control circuitry, and interfaces that may be configured to receive an input from the user 112 and provide an output based on the received input. For example, the I/O device 208 may receive an input associated with a request for predicting the second set of tags for the video 110. The I/O device 208 which may include various input and output devices, may be configured to communicate with the electronic device 102 or the server 104. Examples of the I/O device 208 may include, but are not limited to, a touch screen, a keyboard, a mouse, a joystick, a microphone, a display device (e.g., the display device 208A), a haptic device, and a speaker.

The display device 208A may include suitable logic, control circuitry, and interfaces that may be configured to display the received video 110 and the prediction information. In accordance with an embodiment, the display device 208A may be a touch screen which may enable the user 112 to provide a user-input, via the display device 208A.

The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

The functions or operations executed by the electronic device 102, as described in FIG. 1, may be performed by the circuitry 202. Operations executed by the circuitry 202 are described in detail, for example, in FIG. 3.

Figure 3:
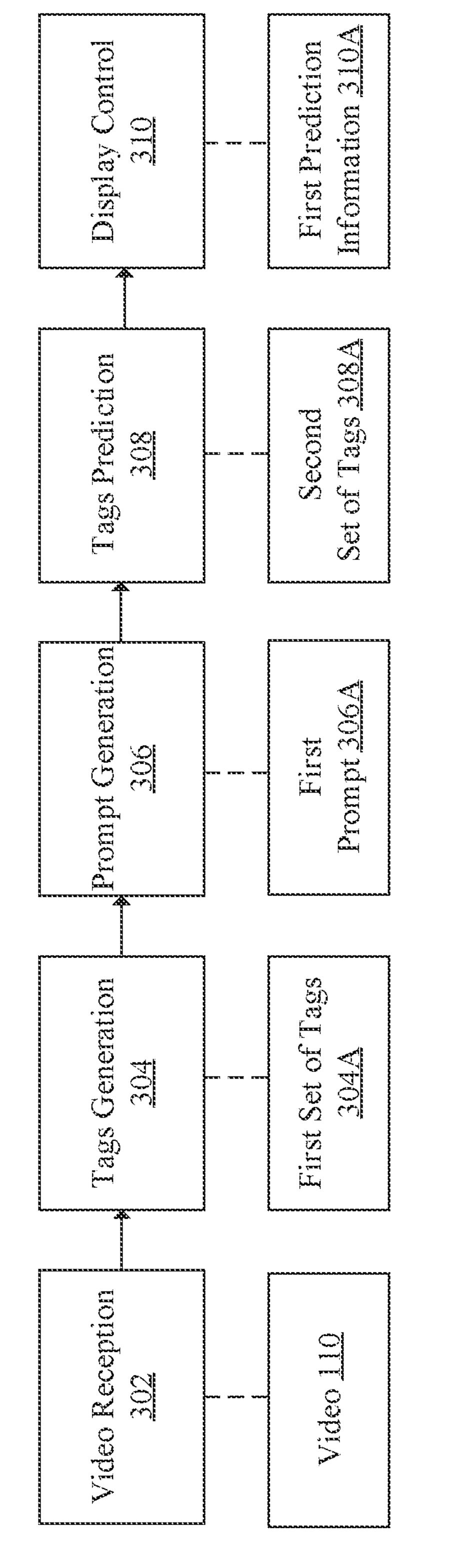
FIG. 3 is a diagram that illustrates an execution pipeline for using neural language models for long-term action anticipation from videos, in accordance with an embodiment of the disclosure.

FIG. 3 is a diagram that illustrates an execution pipeline for using neural language models for long-term action anticipation from videos, in accordance with an embodiment of the disclosure. FIG. 3 is explained in conjunction with elements from FIG. 1 and FIG. 2. With reference to FIG. 3, there is shown an execution pipeline 300 of exemplary operations from 302 to 310 that may be executed by the circuitry 202 of the electronic device 102. FIG. 3 further illustrates the video 110, a first set of tags 304A, a first prompt 306A, a second set of tags 308A, and first prediction information 310A.

At 302, a video reception operation may be executed. In an embodiment, the circuitry 202 may be configured to receive the video 110 that may include one or more objects performing the physical task. The one or more objects may be a person (such as user 112), an autonomous vehicle, a robot, or a combination thereof. As an example, the video 110 may include the user 112 baking a cake. As another example, the video 110 may include two people baking a cake together. In an embodiment, an image capturing device (not shown) may capture the video 110 of the one or more objects performing the physical task. The electronic device 102 may receive the captured video 110 from the image capturing device.

At 304, a tags generation operation may be executed. In an embodiment, the circuitry 202 may be configured to generate, based on the video 110, the first set of tags 304A that may correspond to a first sequence of actions associated with the physical task. In an embodiment, each tag of the generated first set of tags 304A may include a noun and a verb associated with the noun. As an example, the physical task may be the cooking task and the first set of tags 304A may include "sharpens knife, cuts onion, removes onion, peels ginger, cuts ginger, and washes ginger". Herein, the tag "sharpens knife" may include the noun "knife" and the verb "sharpen". Similarly, the tag "cut onion" may include the noun "onion" and the verb "cut".

In an embodiment, the circuitry 202 may further split the received video 110 into a set of segments, and each tag of the generated first set of tags 304A may correspond to a segment of the set of segments. As an example, the received video 110 may be split into "N" number of segments. Each segment may be annotated as "$S_j$" and "$a_j$", where j may be a number from "1" to "N". Further, "$S_j$" may denote a segment "j" in the received video 110 and "$a_j$" may denote a tag associated with the segment "j".

In an embodiment, the first set of tags 304A may be generated by application of the action recognition model 102A on a sequence of frames of the received video 110. The sequence of frames may be provided as an input to the action recognition model 102A. The action recognition model 102A may process the sequence of frames to determine the first set of tags 304A.

In an embodiment, the action recognition model 102A may include a frozen backbone network and a transformer encoder. The frozen backbone network may include a plurality of layers that may be connected together. Further, each layer may be frozen. That is, a set of weights associated with each layer may be kept constant. The transformer encoder may include a set of feed-forward layers that may process an input to determine a representation such as an embedding of the input.

In an embodiment, the circuitry 202 may be configured to apply the frozen backbone network on the received video 110. The circuitry 202 may be configured to extract a set of representations from a set of sampled frames associated with the received video. The circuitry 202 may be further configured to apply the transformer encoder on the extracted set of representations based on at least one learnable query token, wherein the first set of tags 304A may be generated based on the application of the transformer encoder. As an example, the received video 110 may be split into a set of segments. For each segment of the set of segments, the frozen backbone network may extract the set of representations from the set of sampled frames associated with the corresponding segment. Thereafter, a learnable query token and the set of representation may be provided as an input to the transformer encoder. Two separate multiple layer perceptron(s) (MLPs) may decode the verb and noun based on the learnable query token and the set of representations. The decoded verb and the decoded noun may be referred to as a tag associated with a segment. The process may be repeated for each segment in the set of segments for generating the first set of tags 304A.

In an embodiment, the first set of tags 304A may correspond to a first set of time stamps associated with a timeline of the received video 110. As an example, the first set of tags 304A that may correspond to the first sequence of actions associated with the physical task may include the first set of time stamps at which the first sequence of actions may have been performed in the received video 110. For example, the first set of tags 304A may be "sharpens knife at 0.10 seconds, cuts onion at 0.24 seconds, removes onion at 0.40 seconds, peels ginger at 0.50 seconds, cuts ginger at 1.00 minute, and washes ginger at 01:05 minute". Herein, the tag "sharpens knife at 0.10 seconds" may include the noun "knife", the verb "sharpens", and the time stamp as "0.10 seconds".

At 306, a prompt generation operation may be executed. In an embodiment, the circuitry 202 may be configured to generate the first prompt 306A for the neural language model 102B based on the first set of tags 304A. The first prompt 306A may be in a format that may be acceptable to the neural language model 102B. In an embodiment, the first prompt 306A may be same as the first set of tags 304A. For example, the first set of tags 304A for the cooking task may be "sharpen knife, cut onion, remove onion, peel ginger, cut ginger, and wash ginger". The first prompt 306A may be also "sharpen knife, cut onion, remove onion, peel ginger, cut ginger, wash ginger".

In an embodiment, the circuitry 202 may be configured to retrieve historical data that may include pairs of input and output tags corresponding to past actions and past action predictions associated with one or more physical tasks that may be same as or different from the physical task. The first prompt 306A may be generated based on the retrieved historical data and the first set of tags 304A. Herein, an input tag may be a set of past sequence actions associated with a physical task. An output tag may be a set of predicted actions associated with the corresponding physical task. As an example, the retrieved historical data may include a first pair of input and output tags, a second pair of input and output tags, and a third pair of input and output tags. The first pair of input and output tags may correspond to the past actions and the past action predictions associated with a dough kneading task. First input tag may be "open lid, scoop-out flour, pour water, press dough" and the first output tag may be "pour flour, press dough, squeeze flour, cut flour". The second pair of input and output tags may correspond to the past actions and the past action predictions associated with a gardening task. The second Input tag may be "move soil, scoop-out soil, pack soil" and the second output tag may be "take soil, pour soil, add water". The third pair of input and output tags may correspond to the past actions and the past action predictions associated with a furnishing task. The third input tag may be "cut wood, sand wood, hold wood" and the third output tag may be "hold sander, rub sander, dust wood". The physical task performed by the user 112 in the received video 110 may be the cooking task. The first prompt 306A may be generated based on the first pair of input and output tags, the second pair of input and output tags, the third pair of input and output tags, and the first set of tags 304A associated with the cooking task. Details related to the generation of the first prompt 306A based on the historical data are further provided, for example, in FIG. 6.

In an embodiment, the circuitry 202 may be configured to retrieve historical data that may include pairs of input and output tags corresponding to past actions and past action predictions associated with one or more physical tasks that is same as or different from the physical task. The circuitry 202 may be configured to receive an input that may include a first question associated with an objective of the physical task and a second question associated with the second sequence of actions. The first prompt 306A may be generated further based on the historical data and the input. As an example, the first question associated with the objective of the physical task may be "what is the final goal of the physical task?". The second question associated with the second sequence of actions may be "what is a second sequence of actions succeeding the first sequence of action?". Further, the retrieved historical data may include a first pair of input and output tags. The first input tag may be "open lid, scoop-out flour, pour water, press dough" and the first output tags may be "pour flour, press dough, squeeze flour, cut flour". The answer to the first question for the first pair of input and output tags may be the dough kneading task. Similarly, the answer to the second question for the first pair of input and output tags may be the output tag. The historical data, the first question, the second question, and the first set of tags 304A may be used to generate the first prompt 306A, Details related to the generation of the first prompt 306A based on the historical data and the input are further provided, for example, in FIG. 7.

In an embodiment, the circuitry 202 may be configured to apply the neural language model 102B on a first set of tags 304A to predict a second set of tags 308A. The circuitry 202 may be configured to fine-tune the neural language model 102B based on the predicted second set of tags 308A. The first set of tags 304A may be provided as an input to the neural language model 102B. The neural language model 102B may predict the second set of tags 308A. The predicted second set may be compared with the ground-truth second set that may be succeed the first set of tags in a playback timeline. Based on the comparison, a language model loss may be determined. The neural language model 102B may be fine-tuned based on the language model loss. As an example, a supervised learning algorithm may be used to fine-tune the neural language model 102B. Details related to the fine-tuning of the neural language model 102B are further provided, for example, in FIG. 5.

In an embodiment, the circuitry 202 may further generate an output action sequence based on the application of the neural language model 102B on the first prompt 306A. The circuitry 202 may further parse the output action sequence into a set of tags, each of which may include a verb and a noun associated with the verb. The circuitry 202 may further determine whether the set of tags includes an invalid tag and may identify a valid tag that may be nearest to the identified invalid tag from the set of tags based on a distance metric. The circuitry 202 may further update the set of tags by replacing the identified invalid tag with the identified valid tag. It should be noted that in spite of fine-tuning of the neural language model 102B, the output action sequence may be erroneous in some instances. For example, length of the output action sequence may be different from a pre-defined length. Further, the output action sequence may include out of vocabulary actions. In order to handle such errors, post-processing may be performed. The output action sequence may be parsed into the set of tags. Thereafter, each tag may be checked to determine whether the corresponding tag includes a verb and a noun associated with the verb. In case a tag does not include the verb, or the noun associated with the verb, the corresponding tag may be determined as the invalid tag. The invalid tag may be removed from the set of tags. Further, the set of tags may be padded with the valid tag that may be nearest to the identified invalid tag from the set of tags based on the distance metric. As an example, Levenshtein distance may be employed. The length of the updated set of fags may remain the same as the pre-defined length. It should be noted that instead of using the distance metric, order-agnostic loss may be employed in some cases such that out-of-order action predictions may be considered as error free. Further, in order to mitigate errors in the generated output action sequence due to presence of out of vocabulary actions, the vocabulary of the neural language model 102B may be enhanced so that the enhanced vocabulary includes synonyms of the verbs and the nouns.

At 308, a tags prediction operation may be executed. In an embodiment, the circuitry 202 may be configured to predict, by application of the neural language model 102B on the first prompt 306A, the second set of tags 308A that may correspond to the second sequence of actions associated with the physical task. The second sequence of actions may succeed the first sequence of actions.

The first prompt 306A may be provided as an input to the neural language model 102B. The neural language model 102B may process the first prompt 306A and may predict the second set of tags 308A. In an embodiment, the fine-tuned neural language model 102B may be applied on the generated first prompt 306A for predicting the second set of tags 308A. The application of the fine-tuned neural language model 102B may ensure that the predicted second set of tags 308A is optimal.

In an embodiment, the predicted second set of tags 308A may be the updated set of tags and may not include invalid actions. Moreover, the length of the predicted second set of tags 308A may be the pre-defined length and may exclude out of vocabulary actions.

In an example embodiment, the physical task may be a cooking task. Herein, the first set of tags 304A may be "sharpen knife, cut onion, remove onion, peel ginger, cut ginger, and wash ginger". In the present example, the first prompt 306A may include the first set of tags 304A. That is, the first prompt 306A may be generated as "Please complete the sequence of actions: pick knife, cut onion, remove onion, peel ginger, cut ginger, and wash ginger". Based on the first prompt 306A, the second set of tags 308A may be predicted as "open faucet, wash onion, open bag, wash potato cut potato, add oil, heat oil, fry onion, add ginger, add potato". The second set of tags 308A may be the second sequence of actions that may be performed after the first sequence of actions in order to complete the cooking task.

In another example embodiment, the first prompt 306A may be generated based on the retrieved historical data and the first set of tags 304A. The first prompt 306A may include the first pair of input and output tags that may correspond to the past actions and the past action predictions associated with a dough kneading task. First input tags may be "open lid, scoop-out flour, pour water, press dough" and the first output tags may be "pour flour, press dough, squeeze flour, cut flour". The first prompt 306A may further include the second pair of input and output tags that may correspond to the past actions and the past action predictions associated with the gardening task. Herein, the second input tags may be "move soil, scoop-out soil, pack soil" and the second output tags may be "take soil, pour soil, add water". The first prompt 306A may further include the first set of tags 304A that may correspond to the first sequence of actions associated with the cooking task. Herein, the first set of tags 304A may be "sharpen knife, cut onion, remove onion, peel ginger, cut ginger, and wash ginger". Herein, the first pair of input and output tags and the second pair of input and output tags may be treated as examples for predicting the second set of tags 308A. The neural language model 102B may learn from the first pair of input and output tags and the second pair of input and output tags without updating a set of weights of the neural language model 102B. The neural language model 102B may predict the second set of tags 308A for the cooking task, based on the generated first prompt 306A as "open faucet, wash meat, wash potato, cut meat, cut potato". Such an approach of predicting the second set of tags 308A may be called a bottom-up LTA approach.

In an embodiment, the physical task may be a joint task performed by at least two objects. The joint task may include, for example, a first sequence of actions and a second sequence of actions associated with the physical task that may be performed by at least two objects. For example, the physical task may be a surgery that may be jointly performed by a senior medical practitioner and an assistant medical practitioner. A first subset of the first sequence of actions may be performed by the senior doctor and a second subset of the first sequence of actions may be performed by the assistant doctor. The first prompt may be generated to include a first set of tags that correspond to the first subset of the first sequence of actions and the second subset of the first sequence of actions. The neural language model 102B may be applied on the first prompt for predicting the second set of tags that may correspond to the second sequence of actions. The second sequence of actions may be a first subset of actions that may be performed by the senior medical practitioner and a second subset of actions that may performed by the assistant medical practitioner.

In an embodiment, each action of the second sequence of actions associated with the physical task may be sub-divided into a set of granular actions based on an application of a prompt engineering approach. For example, a text-to-text model may be applied on the second sequence of actions. The text-to-text model may generate the set of granular actions for each action of the second sequence of actions. As an example, the second sequence of actions may include an action "make incision". The action "make incision" may be sub-divided into granular actions such as "pick scissors, touch skin, move scissors, and cut skin."

In an embodiment, the circuitry 202 may further predict the objective of the physical task by application of the neural language model 102B on the first prompt 306A. The first prompt 306A may be generated further based on the historical data and the input. In such cases, the circuitry 202 may predict the objective of the physical task by the application of the neural language model 1028 on the first prompt 306A. Thereafter, based on the predicted physical task, the circuitry 202 may further predict the second set of tags 308A that may correspond to the second sequence of actions associated with the predicted physical task. Such an approach may be referred to as a top-down LTA approach of actions prediction. Details related to the top-down LTA approach of actions prediction are further provided, for example, in FIG. 7.

In an embodiment, the circuitry 202 may further predict a second set of time stamps corresponding to the second set of tags 308A based on the application of the neural language model 102B on the first prompt 306A. Each time stamp may indicate a time at which an action of the second sequence of actions is performed. As an example, the second set of tags 308A be "sharpen knife, cut onion, remove onion, wash ginger". The second set of time stamps corresponding to the second set of tags 308A may be 1.10 minutes, 1.14 minutes, 1.40 minutes, and 1.55 minutes, That is, the action "sharpen knife" may be executed at 1.10 minutes, the action "cut onion" at 1.14 minutes, the action "remove onion" may be executed at 1.40 minutes, the action "wash ginger" may be executed at 01:55 minutes".

At 310, an operation of controlling display device may be executed. In an embodiment, the circuitry 202 may be configured to control the display device 208A to display the first prediction information 310A based on the second set of tags. The first prediction information 310A may include the second set of tags 308A and other information such as the timestamps corresponding to the second set of tags 308A. The first prediction information 310A may be rendered on the display device 208A to notify the user 112 about the second sequence of actions. The second sequence of actions may be performed after the first sequence of actions in order to complete the physical task.

In an embodiment, the first prediction information 310A may be displayed further based on the predicted objective. The predicted objective may be the final goal of the physical task. By way of example, and not limitation, the first prediction information 310A may include tags such as "grease pan, add meat, add onion, add ginger, add spices, cook meat". The predicted objective may be preparing a meat-based dish.

In another embodiment, the first prediction information may be displayed further based on the predicted second set of time stamps that corresponds to the second set of tags 308A. The predicted second set of time stamps and the second sequence of actions may be rendered on the display device 208A to inform the user 112 about an expected or anticipated time of occurrence of each action of the second sequence of actions.

In an embodiment, the circuitry 202 may further generate a second prompt based on the predicted second set of tags 308A and may further predict a third set of tags based on the application of the neural language model 102B on the second prompt. The third set of tags may correspond to a third sequence of actions associated with the physical task, and the third sequence of actions may succeed the second sequence of actions. The circuitry 202 may further control the display device 208A to display second prediction information based on the predicted third set of tags. As an example, the physical task may be a gardening task. The first sequence of actions may be "remove soil, open pack, take seeds, add seeds, layer soil". The second sequence of actions may be "fill water, pick can, pour water, empty can, place can". The predicted second set of tags 308A may correspond to the second sequence of actions. The neural language model 102B may be applied on the second prompt. Based on the application of the neural language model 102B, a third set of tags may be determined. The third set of tags may correspond to the third sequence of actions and may be "tear pack, scoop fertilizer, add fertilizer, pick can, pour water". The second prediction information may be displayed based on the predicted third set of tags. Based on the displayed second prediction information, one or more objects may perform the third sequence of actions.

In an embodiment, a fourth sequence of actions may be performed to complete the physical task based on the first prediction information. For example, the displayed first prediction information may state the second sequence of actions as "boil noodles, heat pan, add oil, add vegetables, stir-fry vegetables, mix sauce, add noodles, mix noodles". However, the user 112 may follow a different sequence of actions such as "boil noodles, heat pan, add oil, add vegetables, stir-fry vegetables, add sauce, add noodles, mix noodles". Thus, the action of adding sauce may be absent in the second sequence of actions. In cases where an action (i.e., tag) is incorrectly predicted or is missing from the second sequence of actions, the neural language model 102B may be fine-tuned based on the fourth sequence of actions. The fine-tuning of the neural language model 102B may ensure that the action of adding sauce is included in future predictions of the second set of tags 308A associated with a noodle cooking task.

The electronic device 102 of the present disclosure may employ neural language models for long-term action anticipation from videos. The electronic device 102 may use both the top-down and the bottom-up LTA approach for long-term action anticipation. Further, in some cases, the predicted second set of tags 308A may be post-processed so that any invalid tag present in the second set of tags 308A is replaced with a valid tag to obtain a more accurate set of tags, i.e., the post-processed second set of tags 308A.

Figure 4:
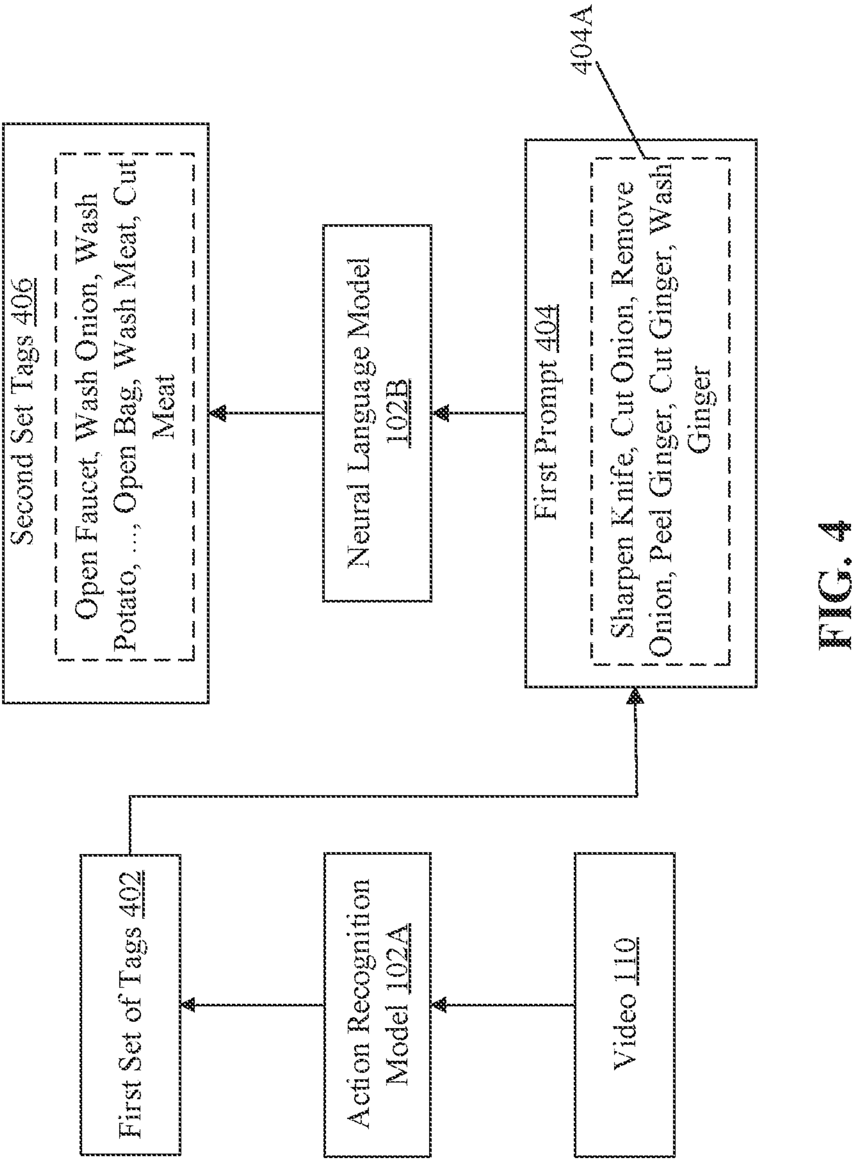
FIG. 4 is a diagram that illustrates an exemplary scenario for using the neural language model based long-term action anticipation from videos, in accordance with an embodiment of the disclosure.

FIG. 4 is a diagram that illustrates an exemplary scenario for using neural language model based long-term action anticipation from videos, in accordance with an embodiment of the disclosure. FIG. 4 is explained in conjunction with elements from FIG. 1, FIG. 2, and FIG. 3. With reference to FIG. 4, there is shown an exemplary scenario 400 for neural language model based long-term action anticipation from videos. The scenario 400 includes the video 110, the action recognition model 102A, a first set of tags 402, a first prompt 404, the neural language model 102B, and a second set of tags 406. A set of operations associated with the scenario 400 is described herein.

With reference to FIG. 4, the action recognition model 102A may be applied on the video 110. Based on the application of the action recognition model 102A, the first set of tags 402 may be generated. The first set of tags 402 may correspond to the first sequence of actions associated with the physical task. The first set of tags 402 may be "sharpen knife, cut onion, remove onion, peel ginger, cut ginger, wash ginger". Based on the first set of tags 402, the first prompt 404 may be generated. The first prompt 404 may include the first set of tags 402. The neural language model 102B may be applied on the first prompt 404. Based on the application of the neural language model 102B, the second set of tags 406 may be predicted. The predicted second set of tags 406 may correspond to the second sequence of actions. The predicted second set of tags 406 may be "open faucet, wash onion, wash potato, . . . open bag, wash meat, cut meat" The predicted second set of tags 406 may be displayed on the display device 208A. In some instances, one or more objects, such as the user 112 or an exemplary electronic device may perform the second sequence of actions after the first sequence of actions to complete the physical task. For example, a robotic manipular may learn to perform or mimic a task by obtaining control instructions corresponding to the first and second sets of tags. It should be noted that the scenario 400 of FIG. 4 is for exemplary purpose and should not be construed to limit the scope of the disclosure.

Figures 5, 6:
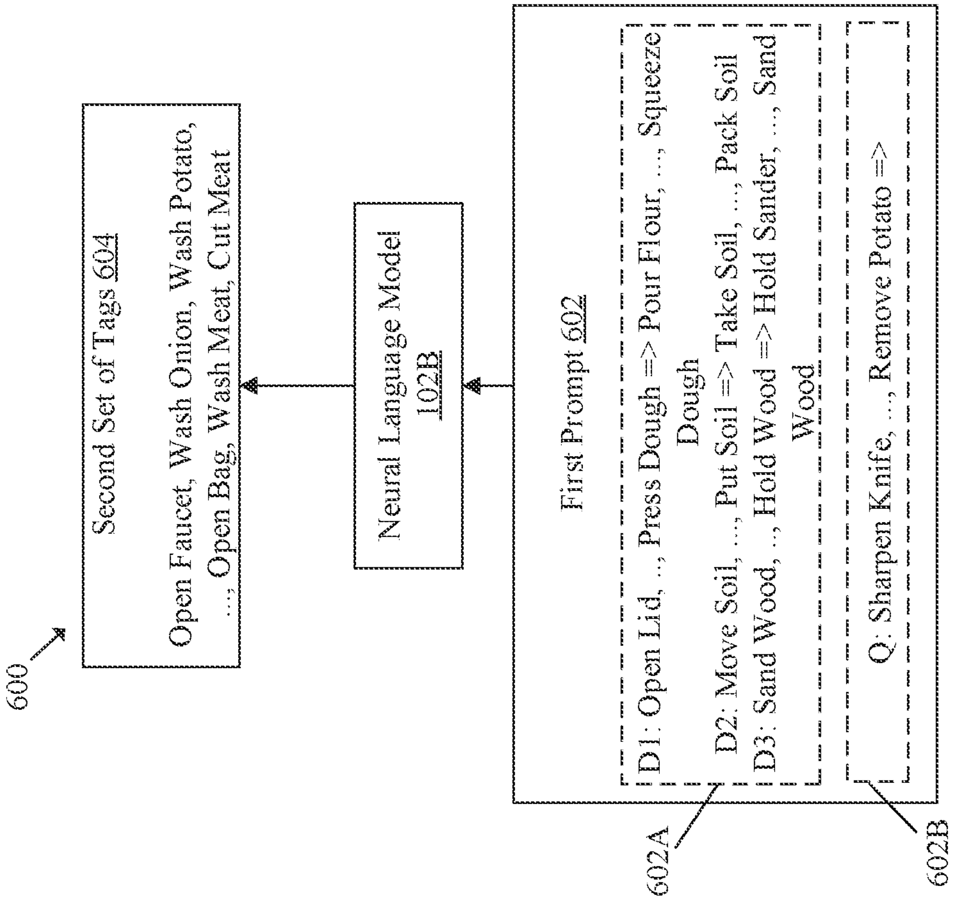
FIG. 5 is a diagram that illustrates an exemplary scenario for fine-tuning of a neural language model, in accordance with an embodiment of the disclosure.
FIG. 6 is a diagram that illustrates an exemplary scenario of using neural language models for long-term action anticipation based on in-context-learning prompts, in accordance with an embodiment of the disclosure.

FIG. 5 is a diagram that illustrates an exemplary scenario for fine-tuning of a neural language model, in accordance with an embodiment of the disclosure. FIG. 5 is explained in conjunction with elements from FIG. 1, FIG. 2, FIG. 3, and FIG. 4. With reference to FIG. 5, there is shown an exemplary scenario 500 for fine-tuning of the neural language model. The scenario 500 includes a first subset 502, the neural language model 102B, a second subset 504, and a language modelling loss 506. A set of operations associated with the scenario 500 is described herein.

With reference to FIG. 3 and FIG. 5, the first subset 502 may be the first set of tags 304A, and the second subset 504 may be the second set of tags 306A. With reference to FIG. 5, the first subset 502 may be "sharpen knife, cut onion, remove onion, peel potato, cut potato, remove potato". The first subset 502 may be provided as an input to the neural language model 102B. Based on the application of the neural language model 102B, the second subset 504 may be predicted. The predicted second subset 504 may be "open faucet, wash ginger, wash potato, . . . , open fridge, touch meat, cut meat". The predicted second subset 504 may be compared with the second portion. In an example, the verb "wash" of the tag "wash ginger" of the predicted second subset 504 may be erroneous. Further, the noun "ginger" of the tag "open ginger" of the predicted second subset 504 may be erroneous. Thus, based on the comparison of the predicted second subset 504 with the second portion, the language modelling loss 506 may be determined. In an example, the language modelling loss 506 may be determined based on a calculation of an edit distance metric. An edit distance for the predicted second subset 504 may be a number of changes that may need to be done on the predicted second subset 504, so that an updated second subset may be same as the second portion. It may be noted that the edit distance metric may consider an order of a tag in the predicted second subset 504 during determination of the language modelling loss 506. In case an order of tags in the predicted second subset 504 is unimportant, then the order-agnostic loss may be determined as the language modelling loss 506. Based on the language modelling loss 506, the neural language model 102B may be fine-tuned. The fine-tuned neural language model 102B may be the applied on the generated first prompt (for example, the generated first prompt 306A). It should be noted that the scenario 500 of FIG. 5 is for exemplary purposes and should not be construed to limit the scope of the disclosure.

FIG. 6 is a diagram that illustrates an exemplary scenario of neural language models for long-term action anticipation based on in-context-learning prompts, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary scenario 600 of neural language models for long-term action anticipation from in-context-learning prompts. The scenario 600 includes a first prompt 602, the neural language model 102B, and a second set of tags 604. The first prompt 602 may include the historical data 602A and the first set of tags 602B. A set of operations associated with the scenario 600 is described herein.

With reference to FIG. 6, the historical data 602A may include pairs of input and output tags corresponding to past actions and past action predictions associated with one or more physical tasks that may be same as or different from the physical task. The historical data 602A may include a first pair of input and output tags, a second pair of input and output tag, and a third pair of input and output tags. The first input tag may be "open lid, . . . , press dough" and the first output tag may be "pour flour, . . . , squeeze dough". The second input tag may be "move soil, . . . , put soil" and the second output tag may be "take soil, . . . , pack soil". The third input tag may be "sand wood, . . . , hold wood" and the third output tag may be "hold sander, . . . , sand wood". The first set of tags 602B may be "sharpen knife, . . . , remove potato". The first prompt 602 may be generated based on the historical data 602A and the first set of tags 602B. The generated first prompt 602 may be provided as an input to the neural language model 102B. The historical data 602A may be treated as an example. The neural language model 102B may learn from the pairs of input and output tags of the historical data 602A. Thus, compared to the fine-tuned neural language model 102B, a task of long-term action anticipation from in-context-learning prompts may not require continuous training the neural language model 102B. That Is, few-shot learning approaches may be used to train the neural language model 102B. Based on the application of the neural language model 102B on the first prompt 602, the second set of tags 604 may be generated. The second set of tags 604 may be "open faucet, wash onion, wash potato, . . . , open bag, wash meat, cut meat". It should be noted that the scenario 600 of FIG. 6 is for exemplary purposes and should not be construed to limit the scope of the disclosure.

Figure 7:
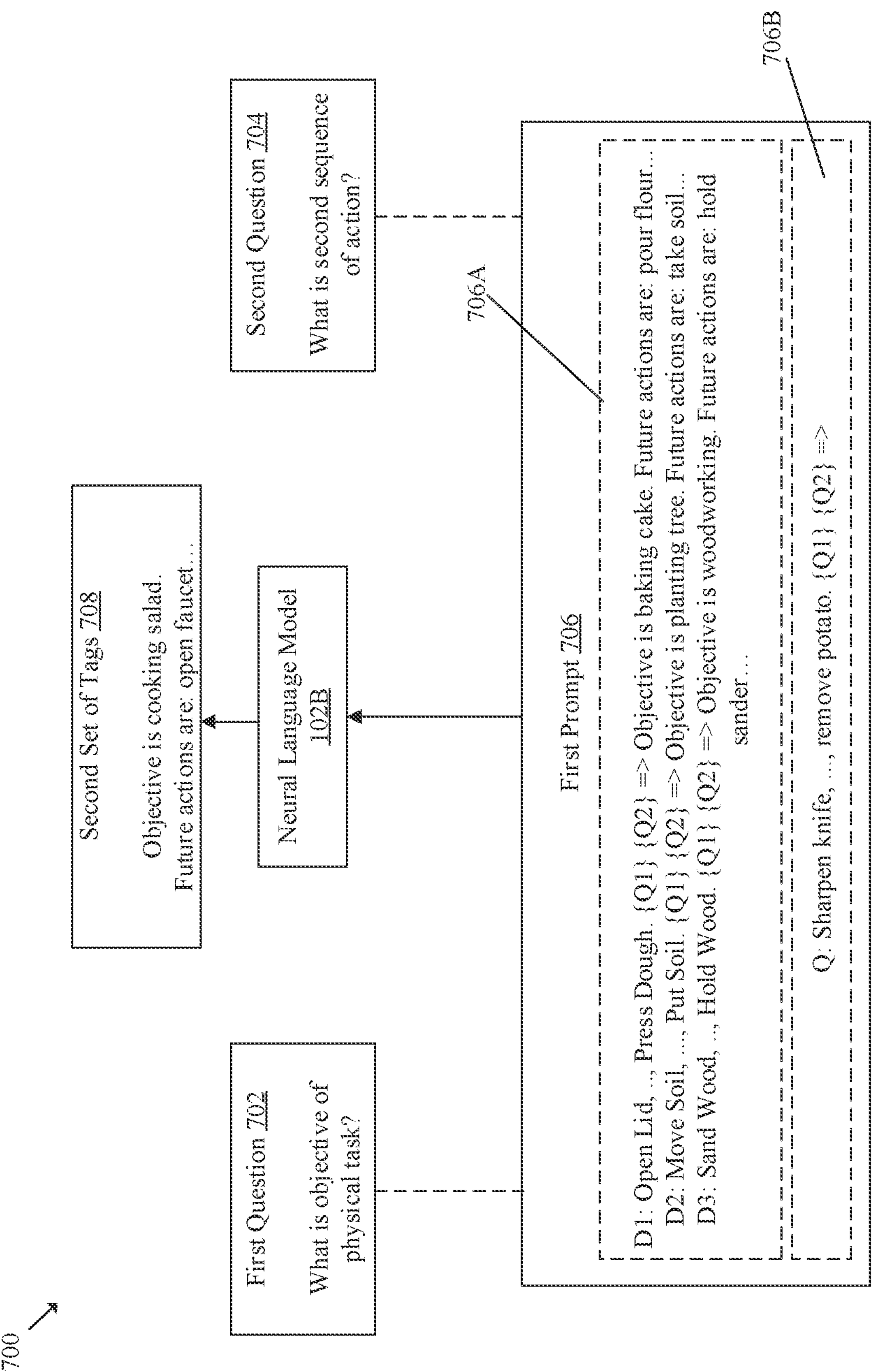
FIG. 7 is a diagram that illustrates an exemplary scenario of using neural language models for long-term action anticipation based on chain-of-thoughts prompts, in accordance with an embodiment of the disclosure.

FIG. 7 is a diagram that illustrates an exemplary scenario of using neural language models for long-term action anticipation based on chain-of-thoughts prompts, in accordance with an embodiment of the disclosure. FIG. 7 is explained in conjunction with elements from FIG. 1, FIG. 2, FIG. 3, FIG. 4, FIG. 5, and FIG. 6. With reference to FIG. 6, there is shown an exemplary scenario 700 of using neural language models for long-term action anticipation from chain-of-thoughts prompts. The scenario 700 includes a first question 702, a second question 704, a first prompt 706, the neural language model 102B, and a second set of tags 708. The first prompt 706 may include historical data 706A and a first set of tags 706B. A set of operations associated with the scenario 700 is described herein.

With reference to FIG. 7, the first prompt 706 may be generated based on the first question 702, the second question 704, the historical data 706A, and the first set of tags 706B. The first question 702 may be "what is the objective of the physical task?". The second question 704 may be "what is the second sequence of action?". The historical data 706A may include pairs of input and output tags corresponding to past actions and past action predictions associated with one or more physical tasks that may be same as or different from the physical task. A first input tag may be "open lid, . . . , press dough" and a second input tag may be "pour flour . . . ". The first input tag and the first output tag may correspond to past actions and past action predictions associated with the physical task of baking cake. A second input tag may be "move soil, . . . , put soil" and a second output tag may be "take soil . . . ". The second input tag and the second output tag may correspond to past actions and past action predictions associated with the physical task of planting tree. A third input tag may be "sand wood, . . . , hold wood" and a third output tag may be "hold sander, . . . ". The third input tag and the third output tag may correspond to past actions and past action predictions associated with the physical task of woodworking. The first set of tags 706B may be "sharpen knife, . . . , remove potato". The neural language model 102B may be applied on the first prompt 706. The neural language model 102B may employ a top-down LTA approach for predicting the second set of tags 708. Herein, the neural language model 102B may infer the objective as cooking salad. Thereafter, based on the inferred objective, the second sequence of actions may be determined as "open faucet, . . . ". It should be noted that the scenario 700 of FIG. 7 is for exemplary purposes and should not be construed to limit the scope of the disclosure.

Figure 8:
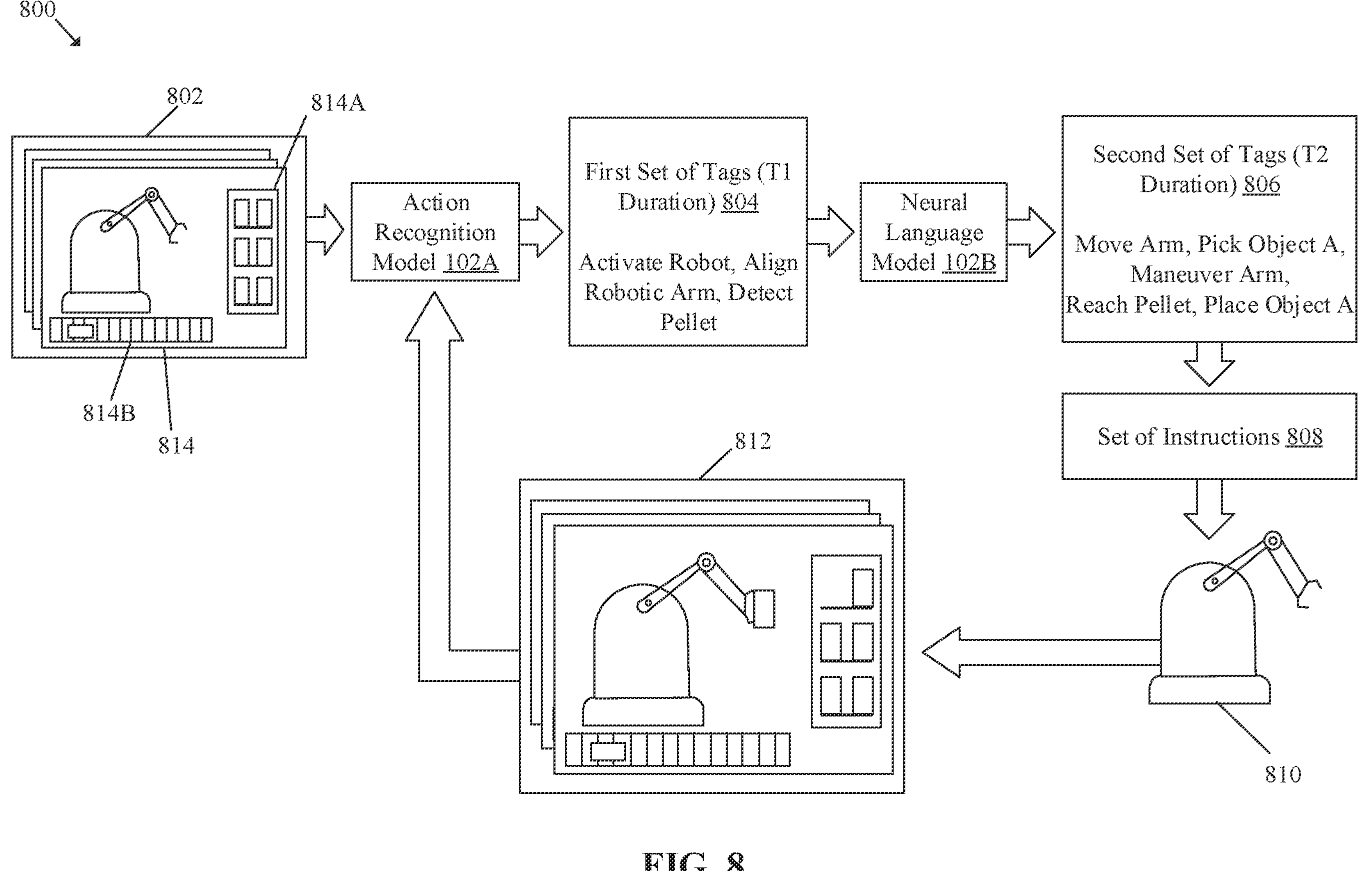
FIG. 8 is a diagram that illustrates an exemplary scenario for instructing a robot based on anticipation of long-term actions, in accordance with an embodiment of the disclosure.

FIG. 8 is a diagram that illustrates an exemplary scenario for instructing a robot based on anticipation of long-term actions, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown an exemplary scenario 800 for instructing a robot based on anticipation of long-term actions. The scenario 800 includes video 802, the action recognition model 102A, a first set of tags 804, the neural language model 102B, a second set of tags 806, a set of instructions 808, a robot 810, and the video 110. The video 802 may include a set of image frames such as, an image frame 814. The image frame 814 may include a set of objects 814A and a conveyer belt 814B. A set of operations associated with the scenario 800 is described herein.

With reference to FIG. 8, a duration of the video 802 may of "T1" minutes. Further, the video may include the robot 810 performing a pick and place task. The robot 810 may need to pick an object from the set of objects 814A and place the picked object in a tray positioned on the conveyer belt 814B. The action recognition model 102A may be applied on the video 802. Based on the application of the action recognition model 102A, the first set of tags 804 may be generated. The first set of tags 804 may be "activate robot, align robotic arm, detect pellet". The neural language model 102B may be applied on the first set of tags 804. Based on the application of the neural language model 102B, the second set of tags 806 may be predicted. The second set of tags 806 may be "move arm, pick object A, maneuver arm, reach pellet, place object A". Based on the predicted set of tags 806, a set of instructions 808 may be generated. The set of instructions 808 may be control instructions for micro-controller(s) or processor(s) that control functions of the robot 810. The set of instructions 808 may be provided to the robot 810. Based on the received set of instructions 808, the robot 810 may actuate joints of the robot's arm and an end effector (e.g., a suction device) connected to a free end of the arm to pick object "A" from the set of objects 814A and place the picked object "A" in tray placed on the conveyer belt 814B. An image-capture device may record a video of the robot 810 picking the object "A" and placing the object "A" in the tray. The video 812 may be of "T2" duration and may be provided as an Input to the action recognition model 102A. The process may be repeated till all items of an order are placed in the tray or a termination condition associated with a control of the robot 810 is met. It should be noted that the scenario 800 of FIG. 8 is for exemplary purposes and should not be construed to limit the scope of the disclosure.

Figure 9:
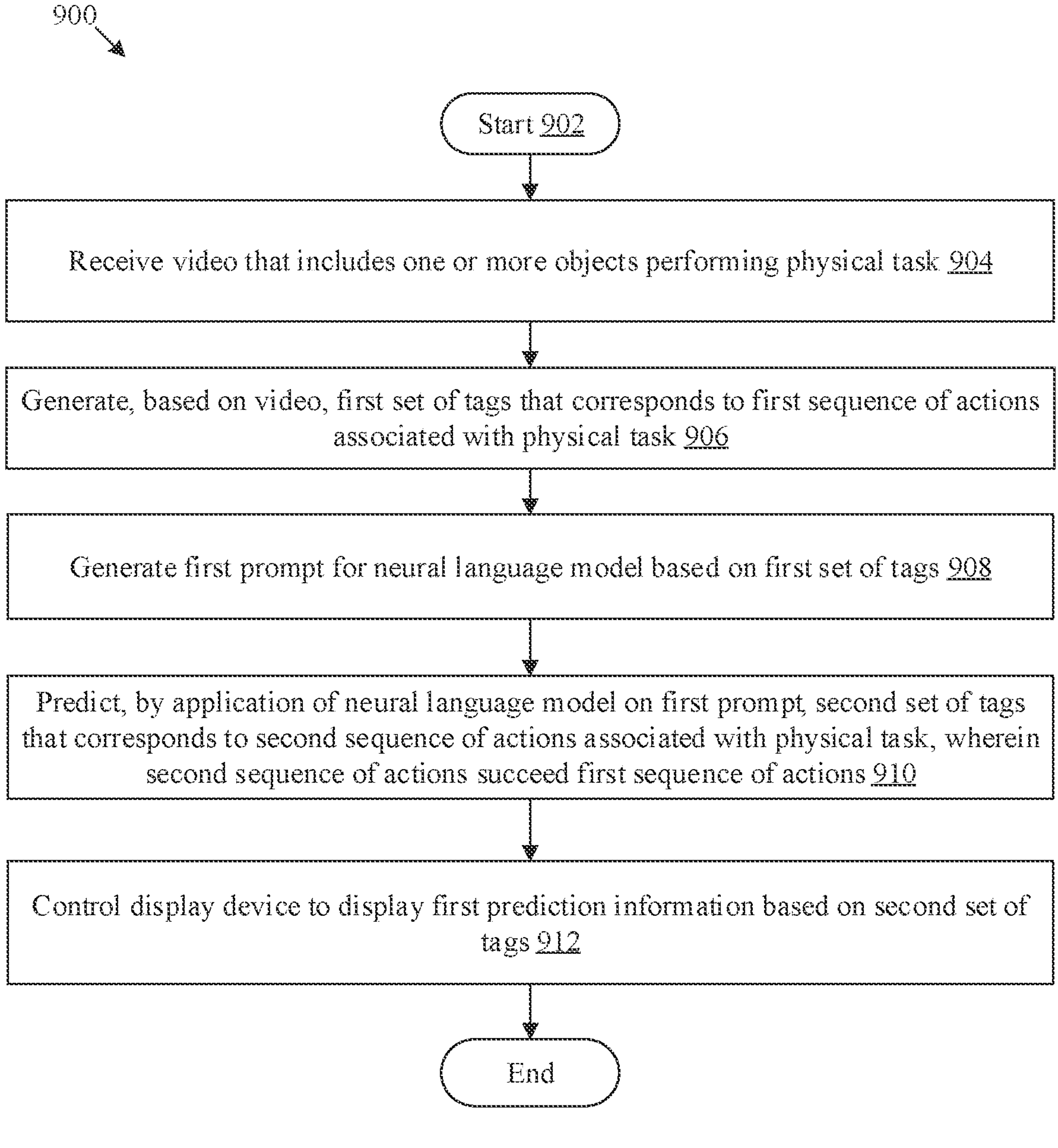
FIG. 9 is a flowchart that illustrates exemplary operations of a method for using neural language models for long-term action anticipation from videos, in accordance with an embodiment of the disclosure.

FIG. 9 is a flowchart that illustrates exemplary operations of a method for using neural language models for long-term action anticipation from videos, in accordance with an embodiment of the disclosure. With reference to FIG. 9, there is shown a flowchart 900. The flowchart 900 is described in conjunction with FIG. 1, FIG. 2, FIG. 3, FIG. 4, FIG. 5, FIG. 6, FIG. 7, and FIG. 8. The operations from 902 to 912 may be implemented, for example, by the circuitry 202 of the electronic device 102 of FIG. 2. The operations of the flowchart 900 may start at 902 and proceed to 904.

At 904, the video 110 that includes one or more objects (for example, the user 112) performing a physical task may be received. The circuitry 202 may receive the video 110 that may include one or more objects (for example, the user 112) performing the physical task. Details related to the reception of the video 110 are further provided, for example, in FIG. 3 (at 302).

At 906, the first set of tags 304A that may correspond to the first sequence of actions associated with the physical task may be generated. The circuitry 202 may generate, based on the video 110, the first set of tags 304A that may correspond to the first sequence of actions associated with the physical task. Details related to the generation of the first set of tags 304A are further provided, for example, in FIG. 3 (at 304).

At 908, the first prompt 306A may be generated for the neural language model 102B based on the first set of tags 304A. The circuitry 202 may generate the first prompt 306A for the neural language model 102B based on the first set of tags 304A. Details related to the generation of the first prompt 306A are further provided, for example, in FIG. 3 (at 306).

At 910, the second set of tags 308A that may correspond to the second sequence of actions associated with the physical task may be predicted by application of the neural language model 102B on the first prompt 306A. The circuitry 202 may predict, by application of the neural language model 102B on the first prompt 306A, the second set of tags 308A that may correspond to the second sequence of actions associated with the physical task. Herein, the second sequence of actions may succeed the first sequence of actions. Details related to the application of the neural language model 102B are further provided, for example, in FIG. 3 (at 308).

At 912, the display device 208A may be controlled to display the first prediction information 310A based on the second set of tags 308A. The circuitry 202 may control the display device 208A to display the first prediction information 310A based on the second set of tags 308A. Details related to the controlling of the display device 208A are further provided, for example, in FIG. 3 (at 310). Control may pass to end.

Although the flowchart 900 is Illustrated as discrete operations, such as 902, 904, 906, 908, 910, and 912 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as, the circuitry 202). The instructions may cause the machine and/or computer (for example, the electronic device 102) to perform operations that may include reception of a video (for example, the video 110) that may include one or more objects (for example, the user 112) performing a physical task. The operations may further include generating, based on the video 110, a first set of tags (for example, the first set of tags 304A) that may correspond to a first sequence of actions associated with the physical task. The operations may further include generation of a first prompt (for example, the first prompt 306A) for a neural language model (for example, the neural language model 102B) based on the first set of tags 304A. The operations may further include predicting, by application of the neural language model 102B on the first prompt 306A, a second set of tags (for example, the second set of tags 308A) that may correspond to a second sequence of actions associated with the physical task. Herein, the second sequence of actions may succeed the first sequence of actions. The operations may further include controlling a display device (for example, the display device 208A) to display first prediction information (for example, the first prediction information 310A) based on the second set of tags 308A.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. An electronic device, comprising:

circuitry that:

receives a video that includes one or more objects performing a physical task;

generates, based on the video, a first set of tags that corresponds to a first sequence of actions associated with the physical task;

generates a first prompt for a neural language model based on the first set of tags and an objective of the physical task;

predicts, by application of the neural language model on the first prompt, a second set of tags that corresponds to a second sequence of actions associated with the physical task and the objective of the physical task, wherein the second sequence of actions succeed the first sequence of actions; and controls a display device to display first prediction information based on the second set of tags.

2. The electronic device according to claim 1, wherein the first set of tags is generated by application of an action recognition model on a sequence of frames of the video.

3. The electronic device according to claim 2, wherein the action recognition model includes a frozen backbone network and a transformer encoder.

4. The electronic device according to claim 3, wherein the circuitry further:

applies the frozen backbone network on the received video;

extracts a set of representations from a set of sampled frames associated with the received video; and applies the transformer encoder on the extracted set of representations based on at least one learnable query token, wherein the first set of tags is generated based on the application of the transformer encoder.

5. The electronic device according to claim 1, wherein the circuitry further splits the received video into a set of segments, and each tag of the generated first set of tags corresponds to a segment of the set of segments.

6. The electronic device according to claim 1, wherein each tag of the generated first set of tags includes a noun and a verb that is associated with the noun.

7. The electronic device according to claim 1, wherein the circuitry further:

applies the neural language model on a first set of tags;

predicts a second set of tags based on application of the neural language model; and fine-tunes the neural language model based on the predicted second sequence of actions, wherein the fine-tuned neural language model is applied on the generated first prompt.

8. The electronic device according to claim 1, wherein the circuitry further:

generates a second prompt based on the predicted second set of tags;

predicts a third set of tags based on application of the neural language model on the second prompt, wherein the third set of tags corresponds to a third sequence of actions associated with the physical task, and the third sequence of actions succeed the second sequence of actions; and controls the display device to display second prediction information based on the predicted third set of tags.

9. The electronic device according to claim 1, wherein the circuitry further retrieves historical data that includes pairs of input and output tags corresponding to past actions and past action predictions associated with one or more physical tasks that is same as or different from the physical task, wherein the first prompt is generated based on the retrieved historical data and the first set of tags.

10. The electronic device according to claim 1, wherein the circuitry further:

generates an output action sequence based on the application of the neural language model on the first prompt;

parses the output action sequence into a set of tags, each of which includes a verb and a noun associated with the verb;

determines whether the set of tags includes an invalid tag;

Identifies a valid tag that is nearest to the identified invalid tag from the set of tags based on a distance metric; and updates the set of tags by replacing the identified invalid tag with the identified valid tag, wherein the predicted second set of tags is the updated set of tags.

11. The electronic device according to claim 1, wherein the circuitry further:

retrieves historical data that includes pairs of input and output tags corresponding to past actions and past action predictions associated with one or more physical tasks that is same as or different from the physical task; and receives an input that includes a first question associated with the objective of the physical task and a second question associated with the second sequence of actions, wherein the first prompt is generated further based on the historical data and the input.

12. The electronic device according to claim 11, wherein the circuitry further predicts the objective of the physical task by the application of the neural language model on the first prompt, wherein the first prediction information is displayed further based on the predicted objective.

13. The electronic device according to claim 1, wherein the first set of tags corresponds to a first set of time stamps associated with a timeline of the received video.

14. The electronic device according to claim 13, wherein the circuitry further predicts a second set of time stamps corresponding to the second set of tags based on the application of the neural language model on the first prompt, wherein the first prediction information is displayed further based on the predicted second set of time stamps.

15. A method, comprising:

in an electronic device:

receiving a video that includes one or more objects performing a physical task;

generating, based on the video, a first set of tags that corresponds to a first sequence of actions associated with the physical task;

generating a first prompt for a neural language model based on the first set of tags and an objective of the physical task;

predicting, by application of the neural language model on the first prompt, a second set of tags that corresponds to a second sequence of actions associated with the physical task and the objective of the physical task, wherein the second sequence of actions succeed the first sequence of actions; and controlling a display device to display the first prediction information based on the second set of tags.

16. The method according to claim 15, wherein the first set of tags is generated by application of an action recognition model on a sequence of frames of the video.

17. The method according to claim 16, wherein the action recognition model includes a frozen backbone network and a transformer encoder.

18. The method according to claim 17, further comprising:

applying the frozen backbone network on the received video;

extracting a set of representations from a set of sampled frames associated with the received video; and applying the transformer encoder on the extracted set of representations based on at least one learnable query token, wherein the first set of tags is generated based on the application of the transformer encoder.

19. The method according to claim 15, further comprising splitting the received video into a set of segments, wherein each tag of the generated first set of tags corresponds to a segment of the set of segments.

20. A non-transitory computer-readable medium having stored thereon, computer-executable instructions that when executed by an electronic device, causes the electronic device to execute operations, the operations comprising:

receiving a video that includes one or more objects performing a physical task;

generating, based on the video, a first set of tags that corresponds to a first sequence of actions associated with the physical task;

generating a first prompt for a neural language model based on the first set of tags and an objective of the physical task;

predicting, by application of the neural language model on the first prompt, a second set of tags that corresponds to a second sequence of actions associated with the physical task and the objective of the physical task wherein the second sequence of actions succeed the first sequence of actions; and controlling a display device to display the first prediction information based on the second set of tags.

* * * * *